J. COAN.
TIRE ARMOR.
APPLICATION FILED FEB. 12, 1917.

1,243,657.

Patented Oct. 16, 1917.
2 SHEETS—SHEET 1.

Witnesses

Inventor
JOHN COAN.
by
Attorneys

J. COAN.
TIRE ARMOR.
APPLICATION FILED FEB. 12, 1917.

1,243,657.

Patented Oct. 16, 1917.
2 SHEETS—SHEET 2.

Witnesses

Inventor
JOHN COAN.
by
Attorneys

UNITED STATES PATENT OFFICE.

JOHN COAN, OF KANSAS CITY, MISSOURI.

TIRE-ARMOR.

1,243,657.  Specification of Letters Patent.  Patented Oct. 16, 1917.

Application filed February 12, 1917.  Serial No. 148,154.

*To all whom it may concern:*

Be it known that I, JOHN COAN, a citizen of the United States, residing at Kansas City, in the county of Jackson and State of Missouri, have invented certain new and useful Improvements in Tire-Armors; and I do declare the following to be a full, clear, and exact description of the invention, such as will enable others skilled in the art to which it appertains to make and use the same.

This invention relates to new and useful improvements in tire armors for pneumatic tires for automobiles and similar motor vehicles.

The principal object of the invention is to provide a simply constructed device of this character which will positively overcome the usual disadvantages of automobile operations resulting from damaged tires.

An additional object is to provide a device of this character having a tread member formed of a resilient material which may be readily replaced by a new tread when the same becomes worn out.

Still another object is to provide removable and interchangeable anti-skid members for attachment to the tread of a protector.

A still further object relates to simply constructed means for holding the protector upon the tread of a tire.

With these and other objects in view, the invention resides in the novel features of construction, combination and arrangement of parts which will be hereinafter more particularly described and claimed, and shown in the drawings wherein:

Figure 1:
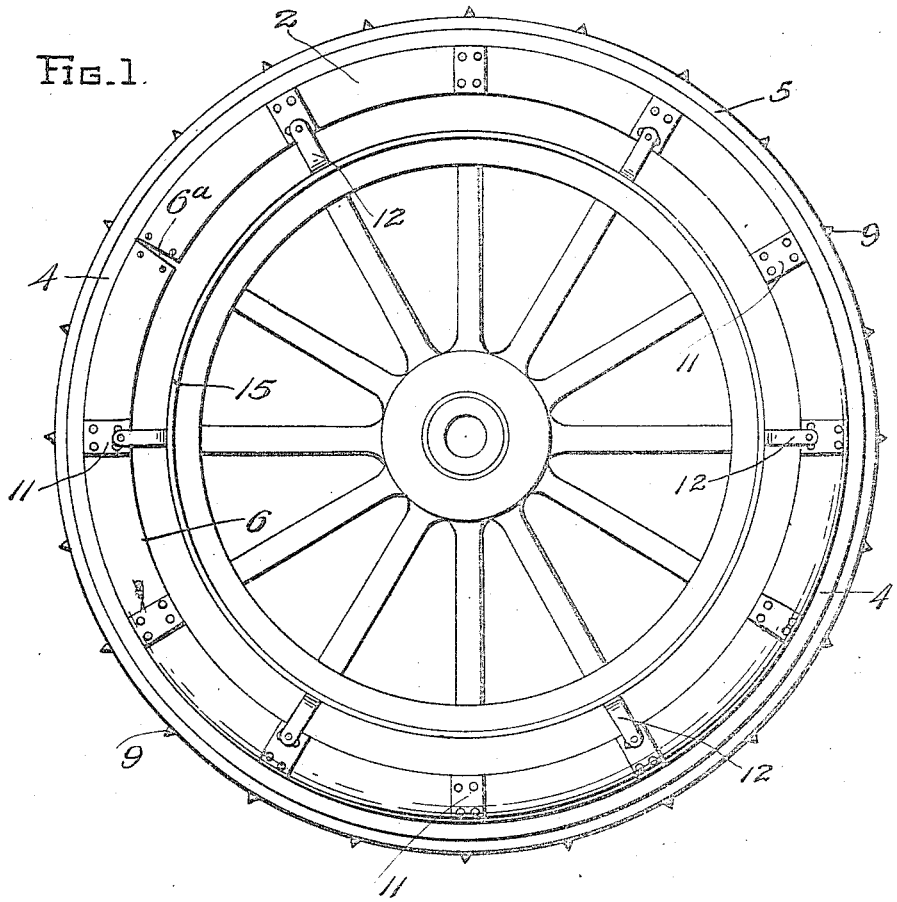
Figure 1 is a side elevation of a wheel showing my invention applied to the pneumatic tire thereof.

In Fig. 1 my invention is illustrated on a pneumatic tire 1 of ordinary construction, and it will be noted from this figure that the same consists of a continuous metallic ring 2 disposed entirely around the tread of said tire, thereby effectively preventing the cutting of the same by glass, tacks, and other sharp articles which may be encountered in running over the roadway. The ring portion 2 of the protector is preferably formed of a light gage sheet metal and bent into substantially semi-circular shape in cross section. This ring is readily placed on the tire 1 when the same is deflated, and after a considerable amount of air has been forced into the inner tube it will be impossible to remove the protector.

Figure 3:
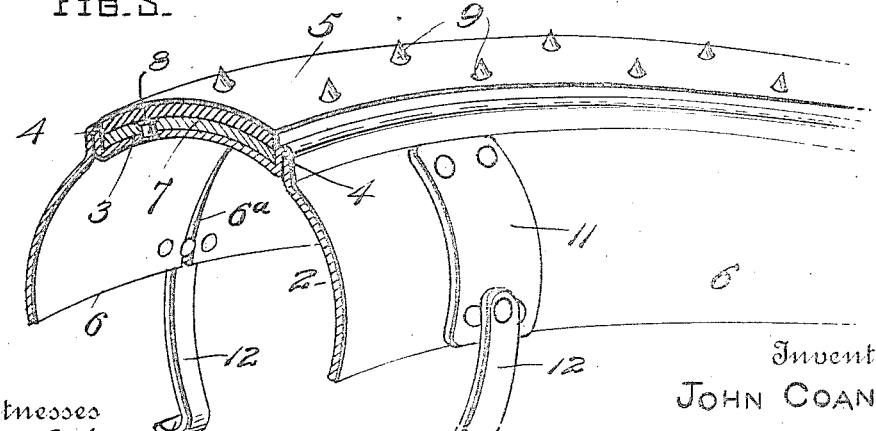
Fig. 3 is a fragmentary sectional perspective view of a portion of the armor.
Figure 2:
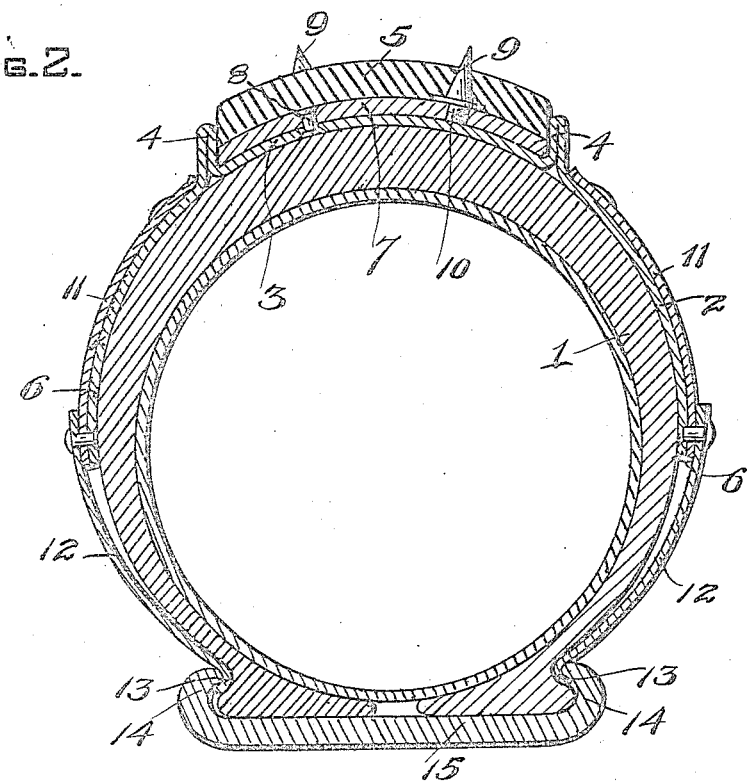
Fig. 2 is an enlarged cross sectional view of a tire mounted upon the rim of a wheel and having an armor constructed in accordance with my invention applied.
Figure 4:
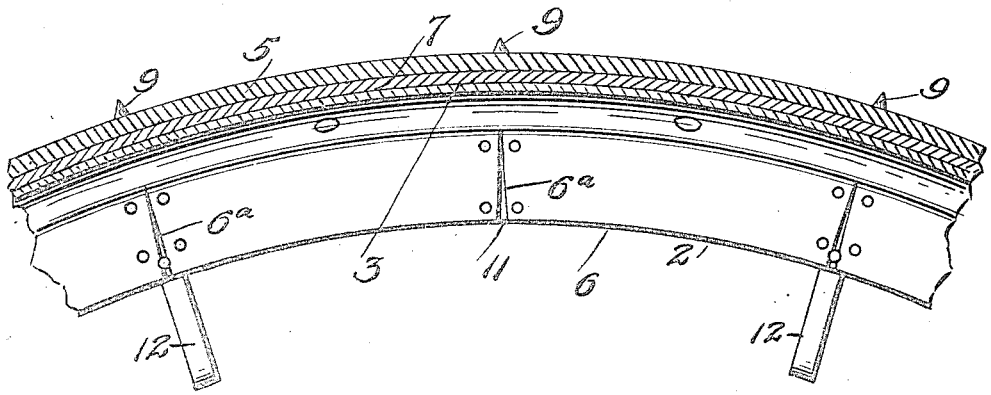
Fig. 4 is a central longitudinal sectional view of a portion of the armor.

It is advisable to provide a tread portion for this ring 2 of some preferably resilient material in order that there will be no unnecessary noise such as would be caused by the contact of the metallic surface with the ground. To hold in place this additional resilient tread, the ring is provided with a longitudinally extending continuous channel 3 which is formed by a pair of parallel outwardly projecting spaced apart ribs 4, the space between the two being substantially in the middle of the ring, thereby forming a seat to receive a resilient band 5 forming the tread herein referred to and which will be hereinafter more particularly described. Each of these ribs 4 is preferably formed by bending the ring upon itself longitudinally of its length as clearly illustrated in Fig. 3, the light gage metal from which the ring is formed readily allowing this bending to be made. Ribs formed in this manner also greatly strengthen the protector and prevent its getting out of shape. The portions of the ring on each outer side of the ribs 4 extend a considerable distance around the sides of the tire 1, thereby more adequately protecting the same as illustrated at 6.

In the channel 3 formed by the ribs 4 is placed a flexible metallic band 7, the same being of a width substantially equal to the distance between the said ribs. This band is secured by suitable fastening elements 8 to the bottom of the channel and is adapted to carry a plurality of anti-skid calks 9. These anti-skid members 9 preferably have threaded shanks 10 to be disposed in threaded openings within the band 7 in order that they may be readily replaced when the outer ends thereof have become worn through use. When new, these outer ends of the calks are preferably conical as illustrated. The above mentioned resilient cushioning member 5 is in the form of a band and is placed around the band 7. It will be noted that this last mentioned band 7 is of a thickness somewhat less than the depth of the channel 3 so that the inner portions of the resilient band 5 also rest in the channel, although the outer portions thereof project beyond the ribs 4 and prevent the latter from coming in contact with the ground. The width of the band 5 is also similar to the width of the other band 7 and its longitudinal edges engage the ribs 4 and prevent lateral shifting. At suitable points in the band 5 are formed openings to receive the outer conical ends of the calks 9, the latter projecting beyond the periphery of the band for the purpose described.

By this arrangement the objectionable noise which would be occasioned by the contact of the metal with the ground will be obviated, and the projecting portions of the calks will effectively prevent skidding of the vehicle upon the tires of which these protectors are placed.

The side portions 6 of the ring 2 are slit as at 6ª at predetermined intervals throughout the length of the protector, thereby allowing the ring to be readily bent in the proper shape and assume the curvature of the tire. After the slits 6ª have been formed and the metal ring bent into the proper shape, reinforcing plates 11 are arranged over the slits and secured to the side portions 6 by rivets or the like.

For holding the protector securely against longitudinal shifting, a number of hook-like attaching arms 12 are pivoted to each of the side portions 6. The pivots for attaching these arms to the ring are preferably extended from the reinforcing plates 11. The free ends of these arms are hook-shaped as illustrated at 13 and are adapted to be keyed beneath the hooked edges 14 of the usual clencher rim 15 by which the tire 1 is secured to the felly of the wheel. The inflation of the inner tube within the casing of the tire 1 causes the edges of said casing to tightly engage the hooked portions 14 and thereby force the hooked ends 13 into tight contact therewith.

I claim:

1. A tire armor of the class described comprising a continuous flexible ring substantially semicircular in cross section to be disposed around the tread of a tire, the tread portion of said ring having a continuous channel, a flexible metallic band having a width substantially equal to that of the channel secured to said ring, a plurality of anti-skid calks removably secured to said band, and a second band of resilient material having a width equal to that of the first mentioned band and disposed on the same in the channel, the outer face thereof projecting beyond the edges of said channel and the aforesaid calks projecting through apertures in the last mentioned band forming holding means for securing the last mentioned band of the device.

2. A tire armor of the class described comprising a continuous flexible ring substantially semi-circular in cross section to be disposed around the tread of a tire, the tread portion of said ring having a continuous channel formed by a pair of parallel spaced apart outwardly extending ribs, said ribs being constructed by bending said ring upon itself longitudinally intermediate its side edges, a flexible metallic band of a width substantially equal to the distance between said ribs and positioned therebetween, a plurality of anti-skid calks carried by and removably connected to said band, and a second band of resilient material of a width similar to that of the first mentioned band and disposed in the channel formed by said ribs, the outer face thereof projecting beyond the edges of the ribs; said band having a plurality of apertures to receive said calks.

3. The combination with a vehicle wheel having a tire thereon; of a continuous flexible ring substantially semi-circular in cross section for engagement with the tread of said tire, the side edges of said ring being slit at predetermined points to permit the same to conform to the curvature of said tire, reinforcing plates secured to the ring and covering said slits, hooked arms pivoted to said reinforcing plates for engagement with the rim of said wheel, and a band of flexible resilient material disposed around the tread portion of said ring.

In testimony whereof I have hereunto set my hand in the presence of two subscribing witnesses.

JOHN COAN.

Witnesses:
 PETE NIELSON,
 HARRY NIELSON.